(12) United States Patent
Chatterjee

(10) Patent No.: US 8,224,822 B2
(45) Date of Patent: Jul. 17, 2012

(54) TEMPLATE BASED ENTITY TRANSFORMATION

(75) Inventor: Ramkrishna Chatterjee, Nashua, NH (US)

(73) Assignee: Oracle International Corporation, Redwood Shores, CA (US)

(*) Notice: Subject to any disclaimer, the term of this patent is extended or adjusted under 35 U.S.C. 154(b) by 262 days.

(21) Appl. No.: 12/620,810

(22) Filed: Nov. 18, 2009

(65) Prior Publication Data

US 2011/0119314 A1 May 19, 2011

(51) Int. Cl.
*G06F 17/30* (2006.01)

(52) U.S. Cl. ....................................... 707/736

(58) Field of Classification Search ................ 707/2, 10, 707/736; 715/500
See application file for complete search history.

(56) References Cited

U.S. PATENT DOCUMENTS

| | | | |
|---|---|---|---|
| 7,519,607 B2* | 4/2009 | Anderson, IV | 1/1 |
| 2007/0124373 A1 | 5/2007 | Chatterjee et al. | |
| 2007/0192671 A1* | 8/2007 | Rufener | 715/500 |

* cited by examiner

*Primary Examiner* — Etienne Leroux

(74) *Attorney, Agent, or Firm* — Kraguljac Law Group, LLC

(57) ABSTRACT

Systems, methods, and other embodiments associated with template based entity transformation are described. One example method includes generating a difference set that describes differences between an existing data entity and a template. The example method may also include applying the template to the existing data entity based on the difference set and conflict resolution choices.

19 Claims, 4 Drawing Sheets

TEMPLATE BASED ENTITY TRANSFORMATION

BACKGROUND

A template is a blueprint for creating new entities. Instead of creating entities from scratch, a template allows a user to create an entity simply by instantiating the template. Additionally, best practice solutions designed by experts can be captured in a template and reused in appropriate fields. Conventionally, new entities are produced based on a template. However, in some cases it may be valuable to transform an existing entity according to a template. For example, for an entity that has been generated based on a template to comply with a certain standard, it may be valuable to update the template and the entity to reflect changes in the standard. Updating an entity created from a basic version of a template to an entity reflecting a more advanced version of the template and applying multiple templates to a single entity are also cases where the ability to modify an entity based on a template may be valuable. Additionally, template based entity transformation may also facilitate completing a partially successful template instantiation that resulted in an incomplete entity.

Some conventional systems do not support template based entity transformation and instead require that a user make changes manually. User performed updates may be inherently error prone and time consuming. Additionally, conventional systems that do support transformations may involve many manual steps. For example, some conventional systems may request users to resolve conflicts that arise between a template and an existing entity.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
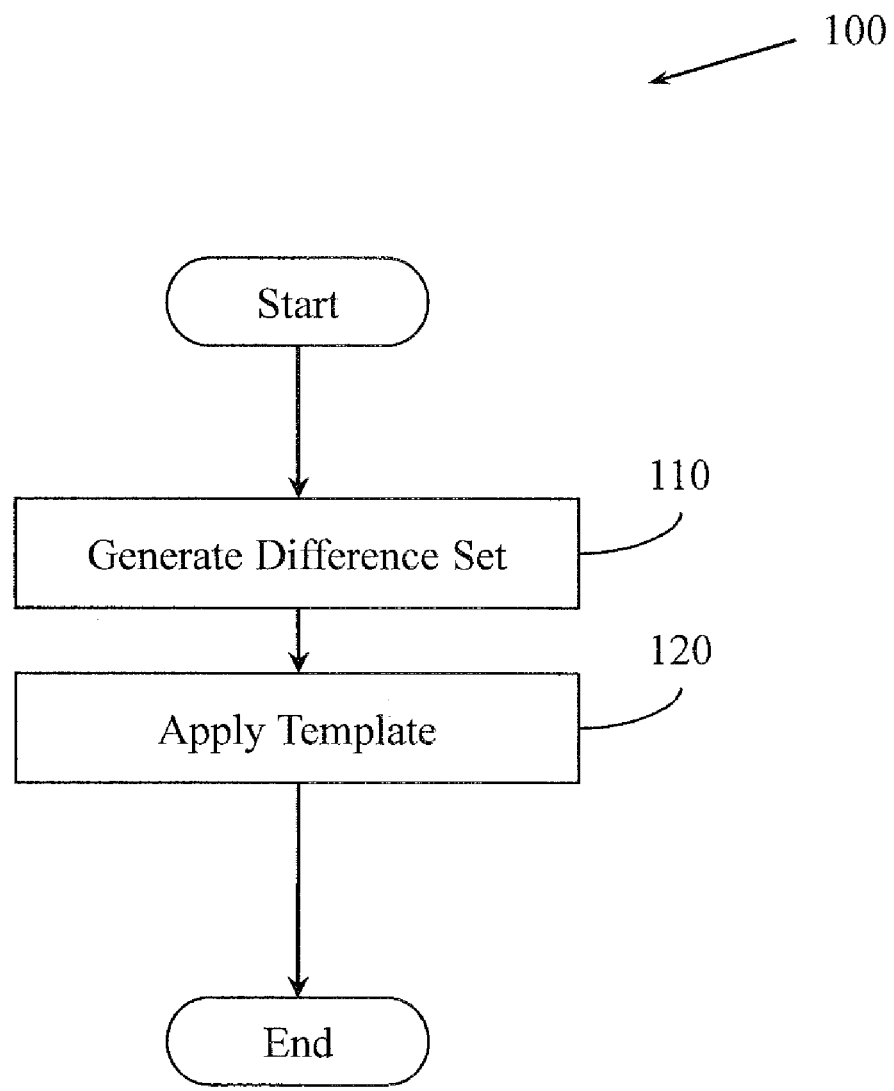
FIG. 1 illustrates an example embodiment of a method associated with template based entity transformation.

Systems and methods associated with template based entity transformation are described. One example method includes generating a difference set. The difference set describes differences between an existing data entity and a template. The difference set may include an insert set that lists items to be added to the data entity. For example, for a template configured to generate a workspace, an existing entity may be an existing workspace and an insert set element may be a file specified in the template that does not already exist in the existing workspace. The difference set may also include an update set that lists elements described in the template that should be updated in the entity. For example, for a template configured to generate a workspace, an existing entity may be an existing workspace and an update set element may be a file specified in the template that does already exist in the existing workspace. The example method may also include applying the template to the entity based on the difference set. This may include adding items described in the insert set to the entity. This may also include updating items in the entity that are described in the update set.

In one example, the difference set may be generated as a result of receiving a request at a data server containing a data store with data entities. The request may be provided from a content server housing content service applications. The content service applications may be, for example, services that handle specialized entities (e.g., time management service, email service). In response to receiving the request, the difference set may be generated by querying a type-registration data store to determine differences between a template identified in the request and a data entity identified in the request. Generating the difference set in the data server may allow the difference set to be quickly generated in a single round trip between the content server and the data server. However, a person having ordinary skill in the art may recognize advantages in generating the difference set as a result of several round trips between the content server and the data server. For example, if data regarding certain types of data entities are only accessible by specific logics on the content server, it may be necessary to formulate requests about these types of data entities through the permitted logics.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a compact disk, other optical medium, a random access memory (RAM), a read only memory (ROM), a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL), an object query language (OQL), a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with template based entity transformation. At 110, method 100 includes generating a difference set that describes differences between an existing data entity and a template. At 120, method 100 includes applying the template to the existing data entity based on the difference set. Generating the difference set may include generating an insert set and generating an update set. The insert set may describe items to be added to the existing data entity. Thus, applying the template to the existing data entity may include adding items described in the insert set to the existing data entity. The update set may describe items in the existing data entity to be modified. Thus, applying the template to the existing data entity may include modifying items in the existing data entity based on the update set.

In one example, applying the template may include performing node-level conflict resolution on update set items based on pre-specified conflict resolution choices. Thus node-level conflict resolution may be performed on items already contained in the existing data entity. The pre-specified conflict resolution choices may be associated with entities described by the template before application of the template begins. Pre-specified conflict resolution choices may include type-level update choices. Type-level update choices may facilitate modifying items that share a particular attribute. Thus, in one example, type-level update choices may facilitate modifying a specific field associated with all items in the update set. Pre specified conflict resolution choices may also include instance-level update choices. Instance-level update choices may cause a specific field of a specific item in the update set to be modified. Instance-level update choices may facilitate modifying individual items. A person having ordinary skill in the art may recognize other conflict resolution options. When a conflict between an existing item and the template is detected that does not have a pre-specified resolution choice associated with it, the conflict may be resolved in favor of the existing item. Applying the template to the existing data entity may facilitate, for example, updating the existing data entity to a new version, upgrading the existing data entity to a more advanced version, ensuring that the existing data entity complies with more than one template, correcting a partially successful attempt of generating the existing data entity, and so on.

While FIG. 1 illustrates various actions occurring in serial, it is to be appreciated that various actions illustrated in FIG. 1 could occur substantially in parallel. By way of illustration, a first process could generate a difference set, and a second process could apply the template to the existing data entity. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

Figure 2:
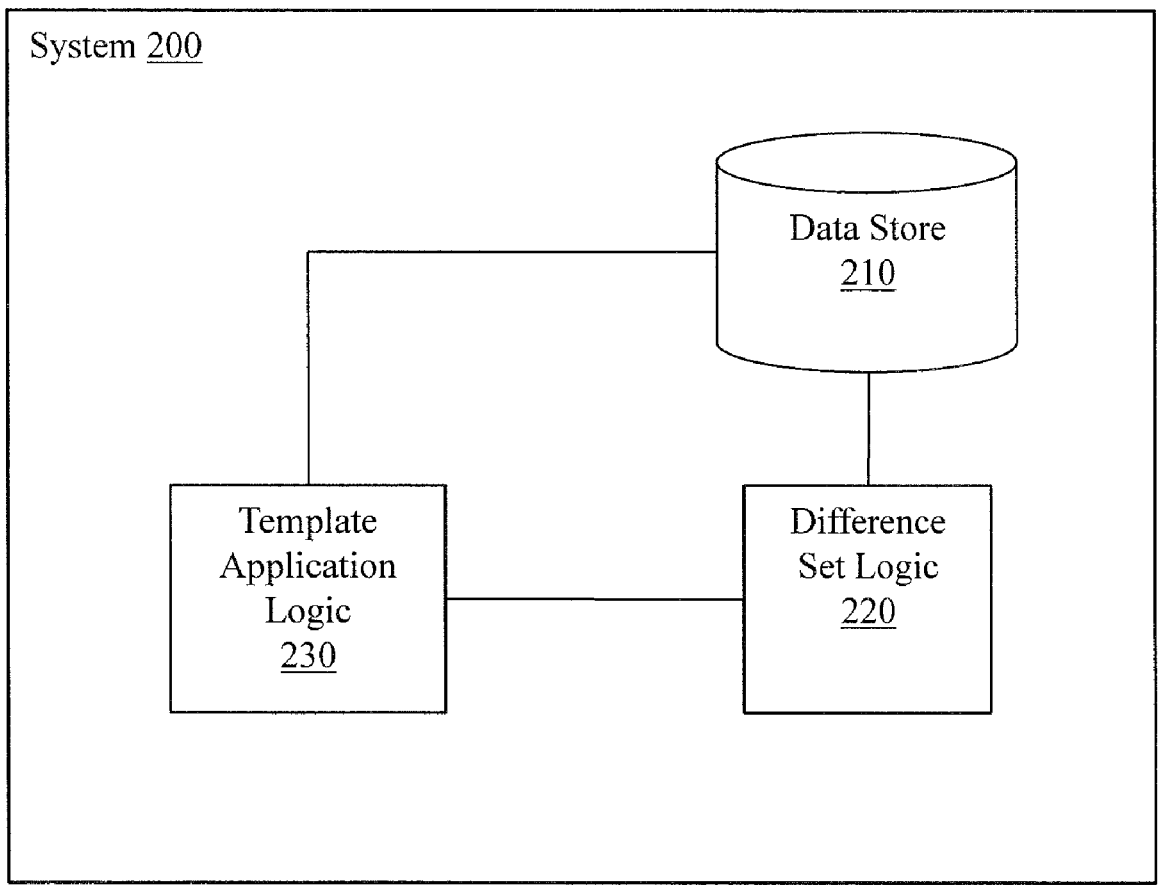
FIG. 2 illustrates an example embodiment of a system associated with template based entity transformation.

FIG. 2 illustrates a system 200 associated with template based entity transformation. The system 200 includes a data store 210. The data store 210 may store data entities. A data entity may include child data entities. By way of illustration a workspace entity may include an email message entity, a file entity having a first storage size, a task entity, and so on. The child entities may be managed by different services. For example, the email message entity, the file entity and the task entity may be managed by an email service, a file service, and a time management service respectively.

The system 200 also includes a difference set logic 220. The difference set logic 220 may generate a difference set that describes differences between a selected data entity in the data store 210 and a template. The difference set may include an insert set and an update set. The insert set may describe child data entities to be added to the selected data entity and the update set may describe child data entities of the selected data entity to be modified.

By way of illustration, a manager for the above workspace may be interested in upgrading the workspace to a more powerful version of the workspace. The template for the more powerful version may include a forum entity and a webpage entity in addition to the email entity, the file entity, and the task entity described above. Additionally, the template may specify that an email account associated with webpage feedback be created. The template for the more powerful version may also specify updated description fields for the existing child entities, and that the file entity be granted a capacity having at least a second storage size. Thus, the insert set may be generated to identify the webpage entity, the forum entity, and the webpage feedback email account entity. Additionally the update set may be generated to include the email message entity, the file entity, and the task entity. In one example, a sparse representation of the insert set may be used. A sparse representation of the insert set may treat descendant template nodes of a higher level template node in the insert set as implied members of the insert set. For example, if a node representing a folder specified in the template is a part of the insert set, all files contained in the folder that are specified in the template may be considered to be implied members of the insert set.

The system 200 also includes a template application logic 230 to initiate the difference set logic 220 and to control transformation of the selected data entity according to the difference set. Continuing with the above example, once the difference set is computed, the template application logic 230 may cause the forum entity, the webpage entity, and the webpage feedback email account entity to be created. Additionally, the template application logic 230 may cause existing child entities (e.g., the email message entity, the file entity, the task entity) to be updated according to the template and pre-specified conflict resolution choices. This may include ensuring that the file entity has access to at least an amount of space as specified by the second storage size and modifying description fields for various entities.

Figure 3:
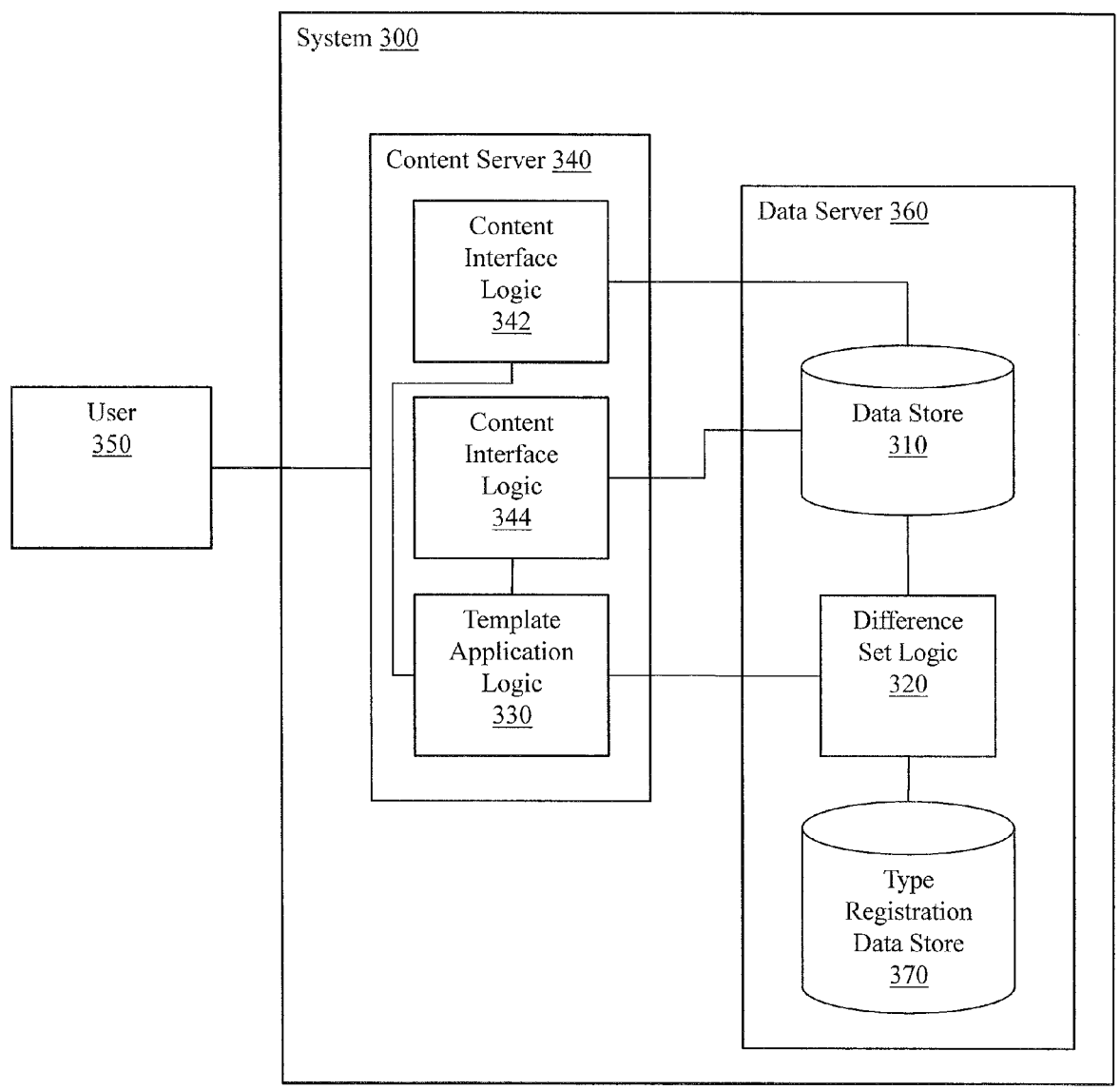
FIG. 3 illustrates an example embodiment of a system associated with template based entity transformation.

FIG. 3 illustrates a system 300 associated with template based entity transformation. The system 300 includes several items similar to those described in connection with system 200 (FIG. 2). For example, the system 300 includes a data store 310, a difference set logic 320 to generate a difference set based on a template and a selected data entity, and a template application logic 330 to transform the selected data entity based on the difference set. However, the system 300 includes additional elements.

The system 300 also includes a content server 340. The content server 340 contains the template application logic 330 and a number of content interface logics including content interface logic 342 and content interface logic 344. Content interface logics may facilitate interactions between a user 350 and data entities in the data store 310. For example, the content interface logic 342 may allow the user 350 to interact with data in the data store 310 that is associated with an email entity and the content interface logic 344 may allow the user 350 to interact with data in the data store 310 that is associated with a webpage entity. In this example, the template application logic 330 may control transformation of the selected data entity by invoking functions of content interface logics. For example, if a difference set states that an email-address is missing from a data entity, the template application logic 330 may invoke a function of a logic that interacts with email entities in the data store 310 that causes an email-address to be created. Similarly, if the insert set identifies a file entity, then the template application logic 330 may invoke a function of a content interface logic that controls file entities to create a file associated with the file entity.

The system 300 also includes a data server 360. The data server 360 contains the data store 310. In one example (not shown), the difference set logic may reside on the content server and generate the difference set based on information obtained by invoking functions of content interface logics. However, this may be inefficient as it may include many roundtrips between the content server and the data server. In another example the difference set logic 320 may reside on the data server 360. Generating the difference set on the data server 360 may reduce the number of data transmissions between the content server 340 and the data server 360. By way of illustration, the difference set may be created as a result of a single roundtrip between the content server 340 and the data server 360. Upon receiving a request to apply a template to a data entity from a user 350, the template application logic 330 may send a request to the data server 360 that causes the difference set logic 320 to create a difference set. Upon completion, the difference set logic 320 may send the difference set back to the template application logic 330. The template application logic 330 may then control transformation of the selected data entity according to the difference set.

To create a difference set in a single roundtrip, the difference set logic 320 may make use of a type registration data store 370. The type registration data store 370 resides on the data server 360 and stores data describing data entities in the data store 360. Entries in the type registration data store 370 may identify an entity type and a data storage identifier. The entity type may identify whether an entity is, for example, an email message, a file, a task, and so on. The data storage identifier may identify a location where entities of this type are stored (e.g., database table identifier). The type registration data store 370 may be a part of the data store 310. However, a person having ordinary skill in the art will recognize advantages of having a separate type registration data store.

Generating the difference set may begin when the difference set logic 320 receives a request identifying the template and the selected data entity. It may be received, for example, from the template application logic 330, which, in turn, may have received a request from a user 350. Generating the difference set may include performing a series of actions on data entities specified in the template. For example, the difference set logic 320 may have determined that a first entity, EP, exists in the data store. The difference set logic 320 may now seek to determine whether a second entity EC exists in the data store 310. The template may specify that EP is a parent of EC. In one example, the difference set logic 320 may first query the type registration data store 370 for an entry that contains information about entities whose type is the same type as EC. The type registration data store may return an identifier of storage location of entities that are the same type as EC. This storage location may be a location DC in data store 310. By way of illustration, if a template identifies a file entity, then a type registration entry associated with the file entities type may contain an identifier of a database table that contains this type of file entities.

After identifying in the data store 310, the location DC of entities of the same type as EC, the difference set logic 320 may query DC for an entity with a parent identifier that points to EP and with a name that matches EC. If there is no entity in DC that matches this query, the difference set logic 320 may add EC to the insert set to identify that EC needs to be created. In one example, the difference set logic may not be recursively applied to descendants of EC specified in the template because descendants of entities identified by the insert set may be considered to be implied members of the insert set. This may be one example of a sparse insert set. On the other hand, if DC does contain an entity matching the query, the difference set logic 320 may add an item that identifies the entity matching the query to the update set. The difference set logic 320 may then seek to recursively evaluate the existence of entities described in the template that are identified as having EC as a parent by looking for data entities that point to the entity matching the query for EC as a parent entity.

Figure 4:
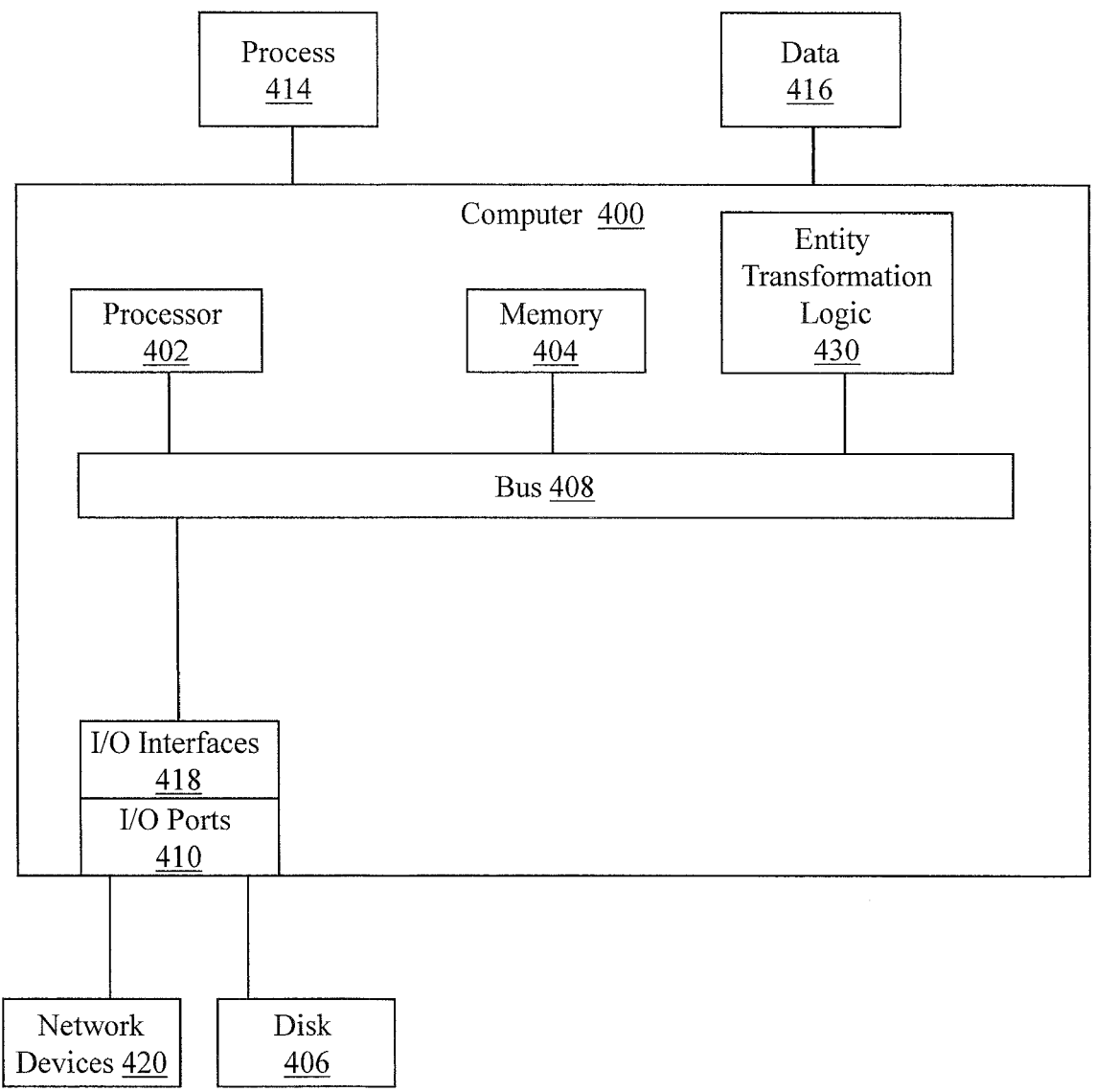
FIG. 4 illustrates an example embodiment of a computing environment in which example systems and methods, and equivalents, may operate.

FIG. 4 illustrates an example computing device in which example systems and methods described herein, and equivalents, may operate. The example computing device may be a computer 400 that includes a processor 402, a memory 404, and input/output ports 410 operably connected by a bus 408. In one example, the computer 400 may include an entity transformation logic 430. In different examples, the logic 430 may be implemented in hardware, software, firmware, and/or combinations thereof. While the logic 430 is illustrated as a hardware component attached to the bus 408, it is to be appreciated that in one example, the logic 430 could be implemented in the processor 402.

Logic 430 may provide means (e.g., hardware, software stored on a computer-readable medium, firmware) for storing a data entity. The means may be implemented, for example, as an ASIC. The means may also be implemented as computer executable instructions that are presented to computer 400 as data 416 that are temporarily stored in memory 404 and then executed by processor 402. Logic 430 may also provide means (e.g., hardware, software stored on a computer-readable medium, firmware) for generating a difference set as a function of comparing the data entity to a template. Entity transformation logic 430 may also provide means (e.g., hardware, software stored on a computer-readable medium, firmware) for applying the template to the data entity based on the difference set.

Generally describing an example configuration of the computer 400, the processor 402 may be a variety of various processors including dual microprocessor and other multi-processor architectures. A memory 404 may include volatile memory (e.g., random access memory (RAM)) and/or non-volatile memory (e.g., read only memory (ROM)).

A disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, an optical disc and so on. The memory 404 can store a process 414 and/or a data 416, for example. The disk 406 and/or the memory 404 can store an operating system that controls and allocates resources of the computer 400.

The bus 408 may be a single internal bus interconnect architecture and/or other bus or mesh architectures. While a single bus is illustrated, it is to be appreciated that the computer 400 may communicate with various devices, logics, and peripherals using other busses (e.g., peripheral component interconnect express (PCIE), 1394, universal serial bus (USB), Ethernet). The bus 408 can be types including, for example, a memory bus, a memory controller, a peripheral bus, an external bus, a crossbar switch, and/or a local bus.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the i/o interfaces 418, and/or the i/o ports 410. Through the network devices 420, the computer 400 may interact with a network. Through the network, the computer 400 may be logically connected to remote computers. Networks with which the computer 400 may interact include, but are not limited to, a local area network (LAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer executable instructions that when executed by a computer cause the computer to perform a method, the method comprising:
   receiving a template that specifies a template entity for inclusion in a workspace, where the template entity is characterized by a template entity type;
   generating a difference set that describes differences between an existing workspace and a template by;
   accessing a type registration data store that maps respective entity types to respective data stores that store entities of the entity type to determine a data store that stores entities of the template entity type;
   querying the data store to determine if the template entity is stored in the data store;
   when the template entity is not stored in the data store, adding the template entity to an insert set that is a subset of the difference set; and
   applying the template to the existing workspace based on the difference set.

2. The non-transitory computer-readable medium of claim 1 where generating the difference set comprises generating an update set that is a subset of the difference set and includes template entities already stored in the data store.

3. The non-transitory computer-readable medium of claim 2 where the update set describes items in the existing workspace to be modified.

4. The non-transitory computer-readable medium of claim 3 where applying the template to the existing workspace comprises modifying items in the existing data entity based on the update set.

5. The non-transitory computer-readable medium of claim 1 where applying the template comprises performing node-level conflict resolution on items contained in the existing workspace based on pre-specified conflict resolution choices.

6. The non-transitory computer-readable medium of claim 5 where the pre-specified conflict resolution choices comprise one or more of, type-level update choices and instance-level update choices.

7. The computer-readable medium of claim 1 where the determining the difference set is performed in a single roundtrip between a content server that receives the template and a data server that stores the template entities.

8. The non-transitory computer-readable medium of claim 1 where the template comprises a specification for creating a workspace.

9. The non-transitory computer-readable medium of claim 1 where applying the template to the existing workspace facilitates one or more of, updating the existing workspace to comply with a new version of a process, upgrading the existing workspace to a more advanced version, ensuring that the existing workspace complies with more than one template, and correcting a partially successful generation of the existing workspace.

10. A system, comprising:
    a database server comprising a data store to store data entities and a difference set logic to generate a difference set that describes differences between a selected data entity in the data store and a template;
    a content server comprising a template application logic to initiate the difference set logic and to control transformation of the selected data entity according to the difference set; and
    where the difference set is created as a result of a single roundtrip between the content server and the data server.

11. The system of claim 10 where the difference set comprises an insert set describing data entities to be added to the selected data entity and an update set describing data entities of the selected data entity to be modified.

12. The system of claim 11 where the content server contains content interface logics that facilitate interactions between users and data entities in the data store.

13. The system of claim 12 where the template application logic controls transformation of the selected data entity by invoking functions of content interface logics.

14. The system of claim 12 where the difference set logic generates the difference set based on information obtained by invoking functions of content interface logics.

15. The system of claim 10 where the data server contains a type-registration data store that maps respective entity types to respective data stores that store entities of the entity type.

16. The system of claim 15, where the type registration data store contains data identifying
    a parent identifier that identifies a parent data entity associated with the data entity.

17. The system of claim 15 where the difference set logic generates the difference set by, upon receiving a request identifying the template and the selected data entity, for each template entity specified in the template:
    accessing a type registration table; to determine a data store that stores entities of the template entity type
    querying the data store to determine if the template entity is stored in the data store;
    when the template entity is not stored in the data store, adding the template entity to an insert set that is a subset of the difference set; and
    when the template entity is stored in the data store, adding the template entity to an update set that is a subset of the difference set.

18. The system of claim 17 where the insert set treats data entities as implied members of the insert set when a data entity is a child of a data entity identified in the insert set.

19. A system, comprising:
    means for storing a data entity in a database associated with a database server;
    means for generating a difference set as a function of comparing the data entity to a template received by a content server, where the difference set is generated as a result of a single roundtrip between the content server and the data server; and
    means for applying the template to the data entity based on the difference set.

* * * * *

UNITED STATES PATENT AND TRADEMARK OFFICE
CERTIFICATE OF CORRECTION

PATENT NO. : 8,224,822 B2  Page 1 of 1
APPLICATION NO. : 12/620810
DATED : July 17, 2012
INVENTOR(S) : Chatterjee It is certified that error appears in the above-identified patent and that said Letters Patent is hereby corrected as shown below:

In column 9, line 46, in Claim 7, delete "computer-readable" and insert
-- non-transitory computer-readable --, therefor.

Signed and Sealed this
Twenty-fifth Day of September, 2012

David J. Kappos
*Director of the United States Patent and Trademark Office*